A. G. SNYDER.

Machine for Bending Shafts.

No. 9,773. Reissued June 21, 1881.

Witnesses:
H. C. McArthur
John C. Rogers

Inventor:
A. G. Snyder
per W. Alexander
Attorney.

N. PETERS, Photo-Lithographer, Washington, D. C.

UNITED STATES PATENT OFFICE.

ANDREW G. SNYDER, OF ASHTABULA, OHIO.

MACHINE FOR BENDING SHAFTS.

SPECIFICATION forming part of Reissued Letters Patent No. 9,773, dated June 21, 1881.

Original No. 148,519, dated March 10, 1874. Application for reissue filed April 26, 1881.

*To all whom it may concern:*

Be it known that I, ANDREW G. SNYDER, of Ashtabula, in the county of Ashtabula and State of Ohio, have invented certain new and useful Improvements in Machines for Bending Shafts; and I do hereby declare that the following is a full, clear, and exact description thereof, reference being had to the accompanying drawings, and to the letters of reference marked thereon, which form part of this specification.

The nature of my invention consists in the construction and arrangement of a machine for bending shafts, as will be hereinafter more fully set forth.

In order to enable others skilled in the art to which my invention appertains to make and use the same, I will now proceed to describe its construction and operation, referring to the annexed drawings, in which—

Figure 1:
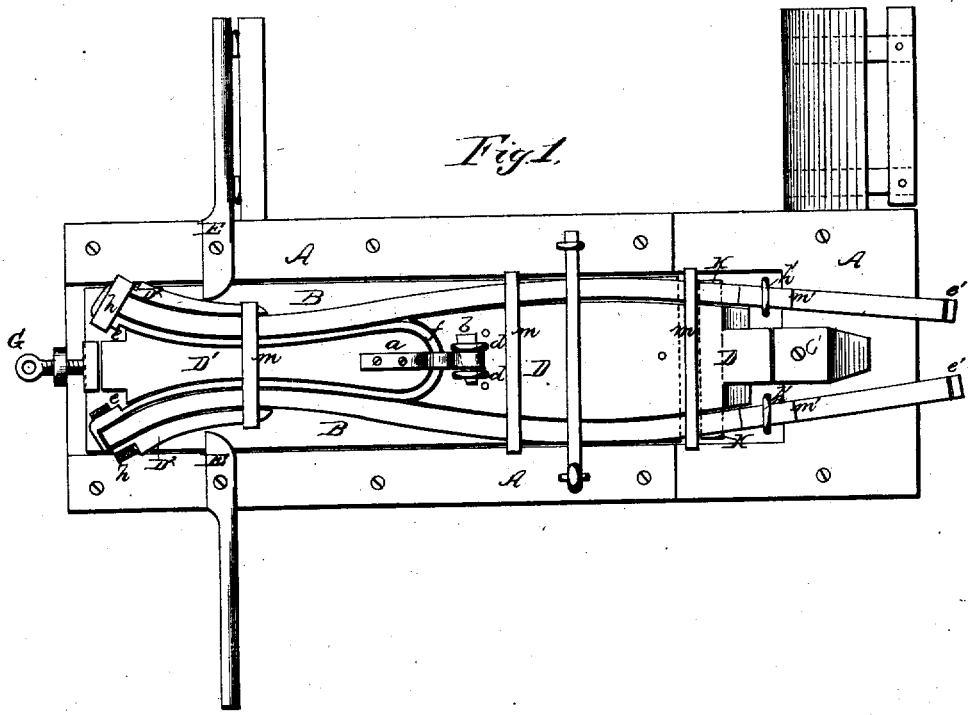
Figure 2:
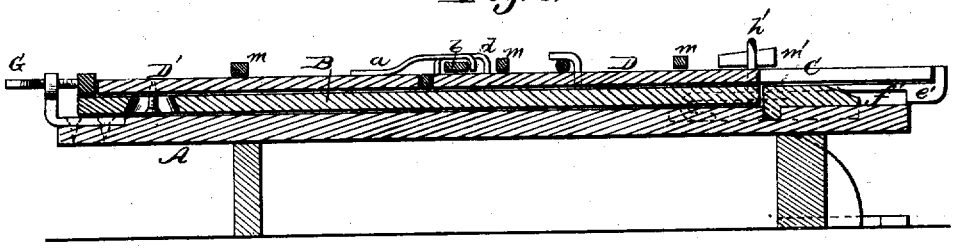
Figure 3:
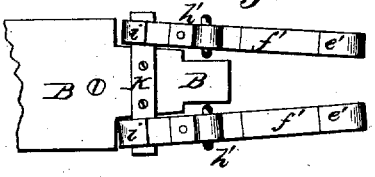
Figure 4:
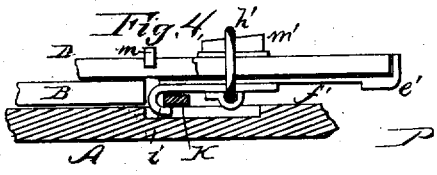

Figure 1 is a plan view; Fig. 2, a longitudinal section; Fig. 3, a detail bottom view of part of the plate B, with its connections; and Fig. 4 is a section through the same.

A represents the bed of my machine, in which is a recess for the reception of the plate B. One end of this plate abuts against an abutment, C, as shown. On the upper surface of the plate B is secured the stationary center-former D, to which is connected the adjustable or movable center former, D′, by means of a hook, *a*, permanently attached to the latter, and held by a key, *b*, in or between staples *d d* on the stationary former. This connecting device is used to hold or retain the end pressure.

The formers D and D′ are constructed substantially in the shape shown in the drawings, so as to bend both right and left shafts at the same time. Around the movable former D′ is a metal strap, *f*, provided at its ends with abutments *e e*, against which one end of each piece of timber to be bent is placed. Outside of the pieces of timber are placed short formers $D^2$ $D^2$, for making the outside tip bend, the whole being held together by means of straps *h h*. The short tip-formers $D^2$ $D^2$ are operated upon by cam-levers E E, pivoted on the bed A. The other ends of the pieces of timber to be bent are placed against abutments *e′ e′* on heel-straps *f′ f′*, the front ends of which form hooks *i i*, to be fastened on a cross-bar, *k*, attached to the under side of the plate B. Each heel-strap *f′* is provided with a strap, *h′*, passing over the timber, and through the same is passed a wood key, *m′*, to hold the timber to the strap.

The heel-straps *f′ f′* may be curved or bent upward more or less, according as it is desired to have the rear or heel ends of the shafts bent more or less.

The pieces of timber being placed in position, the movable center former, D′, is forced inwardly by means of a set-screw, G, and the levers E E applied on the outside of the short formers $D^2$. Clamps *m m* are placed across the center and outside formers and the timbers to hold the same together. When the desired pressure is obtained, the key *b* is inserted, to hold the hook *a*, and thus retain the pressure.

Having thus fully described my invention, what I claim as new, and desire to secure by Letters Patent, is—

1. In a shaft-bending machine, the combination of a movable former, adjustably keyed or connected to a stationary former, both operating in the same plane and between the shafts, with end and side forcing devices, substantially as described, whereby the outer end of the shafts may be curved inwardly and outwardly simultaneously, all substantially as herein set forth.

2. In a shaft-bending machine, the combination of a stationary former and a movable former keyed thereto and operating in the same plane with a metal strap, provided at its ends with abutments, and end and side forcing or pressing devices, all constructed and arranged to operate substantially as and for the purpose herein set forth.

3. The combination, in a shaft-bending machine, of the stationary former D, abutment C, movable former D′, provided with means for holding or retaining the end pressure, metal strap *f*, having abutments *e e*, formers $D^2$ $D^2$, and suitable mechanism for pressure, all sub-stantially as and for the purpose set forth.

4. The combination of the formers D D′ $D^2$, straps *f f′*, abutments *e e′*, and the fastening devices herein described, for bending right and left shafts at the same time, substantially as and for the purposes herein set forth.

5. The combination, in a shaft-bending machine, of bed-piece A, plate B, stationary former D, and movable former D′ adjustably connected thereto, with metal straps *f f′*, abutments *c c′*, screw G, levers E E, and suitable devices for holding the shafts in place, all constructed and arranged to operate substantially as and for the purpose set forth.

In testimony that I claim the foregoing as my own I affix my signature in presence of two witnesses.

ANDREW G. SNYDER.

Witnesses:
W. A. SNYDER,
W. D. RICHARDS.